United States Patent [19]

Brownlee

[11] 4,086,819
[45] May 2, 1978

[54] ROLLING SEAL FOR A WELL HAVING A ROD-TYPE PUMP

[76] Inventor: Curtis Mitchell Brownlee, 3033 Rolling Stone Rd., Oklahoma City, Okla. 73120

[21] Appl. No.: 578,666

[22] Filed: May 19, 1975

[51] Int. Cl.² ............................................. F16J 15/50
[52] U.S. Cl. ...................... 74/18.2; 417/545
[58] Field of Search ............... 74/18.1, 18.2; 92/98 D, 92/165, 168; 417/545, 546, 548; 166/82–84

[56] References Cited

U.S. PATENT DOCUMENTS

| | | | |
|---|---|---|---|
| 1,038,636 | 9/1912 | Oxnard | 92/98 D |
| 1,060,961 | 5/1912 | Waitz | 166/84 |
| 1,910,762 | 5/1933 | Grinnell et al. | 166/82 |
| 2,178,953 | 11/1939 | Chilton | 92/98 D |
| 2,230,856 | 2/1941 | Andrew | 166/84 |
| 2,253,046 | 8/1941 | Pierce | 166/84 |
| 2,692,618 | 10/1954 | Ludowici | 92/98 D |
| 2,725,078 | 11/1955 | Glancy | 92/98 D |
| 2,832,223 | 4/1958 | Couraud | 74/18.2 |
| 2,846,983 | 8/1958 | Otto | 92/98 D |
| 2,860,017 | 11/1958 | Honegger | 92/98 D |
| 3,118,389 | 1/1964 | Camp | 74/18.2 X |
| 3,244,013 | 4/1966 | Deschner | 74/18.2 |
| 3,353,606 | 11/1967 | Dyer | 74/18.2 |
| 3,369,411 | 2/1968 | Hines | 74/18.2 |
| 3,382,954 | 5/1968 | Charlson | 74/18.2 X |
| 3,439,913 | 4/1969 | Kamman | 74/18.2 |
| 3,796,103 | 3/1974 | Winfield, Jr. | 74/18.2 |

*Primary Examiner*—William L. Freeh
*Assistant Examiner*—Edward Look
*Attorney, Agent, or Firm*—Dunlap, Codding & McCarthy

[57] ABSTRACT

A rolling seal assembly for sealing between a well head and a pump rod reciprocating a predetermined stroke distance through an opening in the well head, the seal assembly comprising a substantially tubular, flexible seal encircling the rod adjacent to the well head, the seal having a first end sealingly connected around the rod and a second end sealingly connected to the well head around the opening, the seal rollingly extending between the first and second ends thereof as the first end reciprocates with the rod.

10 Claims, 5 Drawing Figures

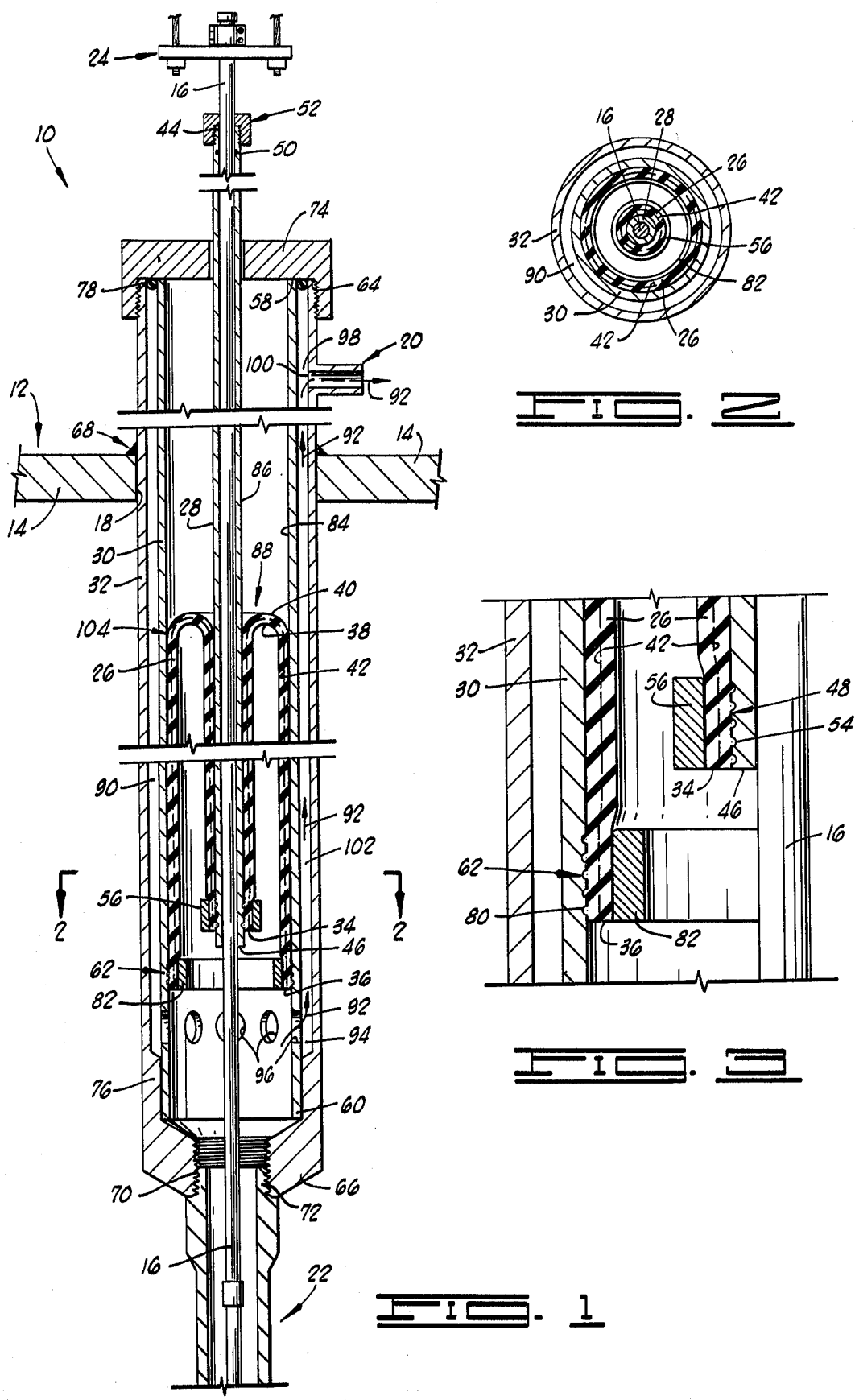

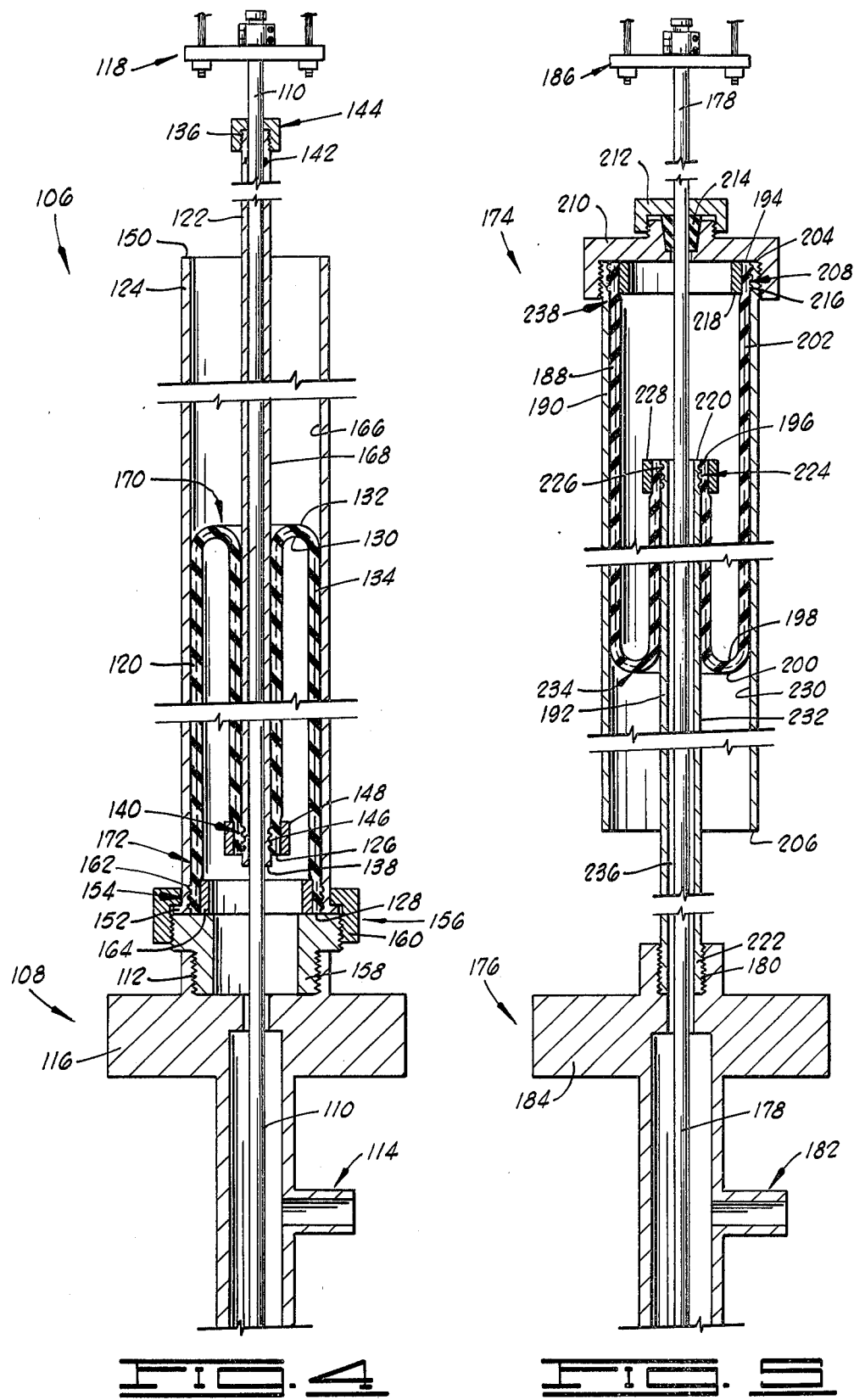

ROLLING SEAL FOR A WELL HAVING A ROD-TYPE PUMP

BACKGROUND OF THE INVENTION

1. Field of the Invention

This invention relates generally to well head seals and, more particularly, but not by way of limitation, to a rolling-type well head seal assembly.

2. Description of the Prior Art

In general, wells utilizing surface power units rely upon conventional stuffing boxes to seal between the well head and the reciprocating pump rod. Normally these units utilize special pump rods, usually referred to as polish or polished rods, for that portion of the pump rod reciprocating adjacent to the stuffing box in order to minimize frictional wear. Often, polished rod protectors, such as that described in U.S. Pat. No. 3,796,103 are employed to prevent airborne abrasives from coming into contact with the polished rod/packing interface. However, the frictional wear between the packing in the stuffing box and the polished rod is still sufficiently great to require frequent adjustment and replacement of the packing.

In an effort to eliminate the frictional wear problem, various accordion type pump rod seals, such as that described in U.S. Pat. No. 3,369,411, have been devised to provide fluid tight sealing between the well head and the pump rod without using the stuffing box/polished rod combination. Such seals, however, are subjected to considerable longitudinal and radial flexing resulting in relatively rapid failure. In addition, such seals are generally incapable of withstanding high pressures due to the large surface area exposed to the pressure.

SUMMARY OF THE INVENTION

It is an object of this invention to provide a rolling seal for sealing between a well head and a pump rod reciprocating therethrough, eliminating the need for a stuffing box.

It is another object of this invention to provide a rolling seal which is substantially maintenance-free throughout a long life of sealing between a well head and a pump rod reciprocating therethrough.

Still another object of this invention is to provide a rolling seal which is capable of withstanding high pressures while sealing between a well head and a pump rod reciprocating therethrough.

Yet another object of this invention is to provide a rolling seal which is simple in design and economical in manufacture.

A further object of this invention is to provide a rolling seal which is easily and economically field installable and maintainable.

Other objects and advantages of this invention will be evident from the following detailed description when read in conjunction with the accompanying drawings which illustrate various embodiments of the invention.

BRIEF DESCRIPTION OF THE DRAWINGS

FIG. 1 is a longitudinal cross sectional view of an operational rolling seal assembly constructed in accordance with the preferred embodiment of the present invention.

FIG. 2 is a cross sectional view of the preferred embodiment taken along lines 2—2 in FIG. 1.

FIG. 3 is an enlarged view of the seal engaging portion of the preferred embodiment shown in FIG. 1 showing a slightly modified second cylinder.

FIG. 4 is a longitudinal cross sectional view of an operational rolling seal assembly constructed in accordance with another embodiment of the present invention.

FIG. 5 is a longitudinal cross sectional view of an operational rolling seal assembly constructed in accordance with still another embodiment of the present invention.

DESCRIPTION OF THE PREFERRED EMBODIMENT

Referring to the drawings in general and to FIGS. 1, 2 and 3 in particular, shown therein and designated by the reference number 10 is a rolling seal assembly constructed in accordance with the present invention. The rolling seal assembly 10, as shown in the operational embodiment of FIG. 1, is for sealing between a well head 12, a portion of which is shown at 14, and a pump rod 16 reciprocating through an opening 18 in the well head 12. In general, the well head 12 has an appropriately positioned outlet port 20 in fluid communication generally with the opening 18 through the well head 12. Further, the well head 12 is suitably connected to a down hole tubing string 22 providing a flow path between the outlet port 20 and the tubing string 22, so that fluids being pumped up the tubing string 22 may exit the well head 12 via the outlet port 20.

As will be clear to one skilled in the art, the pump rod 16 is reciprocated through a predetermined stroke distance by a surface pumping unit (not shown) of conventional design. The pump rod 16 is connected to the pumping unit via a conventional bridle assembly 24. In all of the FIGS. 1, 4 and 5, the pump rod 16 is shown in a position near the bottom of the pump stroke for reasons of convenience.

In the preferred embodiment, the rolling seal assembly 10 is comprised primarily of a flexible seal 26, a first cylinder 28, a second cylinder 30 and a third cylinder 32. The seal 26 is substantially tubular in shape and sized in width to substantially encircle the rod 16 adjacent to the well head 12. The seal 26 has a first end 34 and a second end 36, and is sized in length to extend lengthwise at least one-half of the stroke distance for reasons which will be made clear below. For clarity of reference, the seal 26 will be considered as having a pressurized side 38 exposed to the fluid being pumped, and a non-pressurized side 40 exposed to substantially atmospheric pressure.

In the preferred embodiment, the seal 26 is longitudinally reinforced by a plurality of reinforcing strands as indicated by the reference numeral 42. Thus, the reinforcing strands 42 are disposed substantially parallel to each other and extend substantially from the first end 34 of the seal 26 to the second end 36 thereof. The reinforcing strands 42 may be made of any suitable flexible material such as Rayon, Dacron or fiberglass, and may, if extra strength is required, be formed as flexible strands of a metal such as steel.

The first cylinder 28 has an upper end 44, a lower end 42 and a seal engaging portion 48 (see FIG. 3). The first cylinder 28 preferably has an inner diameter substantially the same size as the outer diameter of the rod 16 so that the first cylinder 28 effectively forms a sleeve over the rod 16. The first cylinder 28 is sealingly connected to the rod 16 by an O-ring 50 so that fluids are prevented from passing up the annulus between the first cylinder 28 and the rod 16. The first cylinder 28 is physically connected or clamped to the rod 16 by a collet-type clamp 52 on the upper end 44 thereof, so that the first cylinder 28 reciprocates with the rod 16.

In the preferred embodiment, the seal engaging portion 48 of the first cylinder 28 has a plurality of annular grooves 54 therein around the outer circumference thereof (see FIG. 3). A compression ring 56 sealingly connects the first end 34 of the seal 26 to the seal engaging portion 48 of the first cylinder 28, by compressing the first end 34 of the seal 26 into sealing engagement with the grooves 54. Thus it is clear that the first end 34 of the seal 26 will reciprocate with the first cylinder 28 and the rod 16. As shown in FIG. 3, the seal engaging portion 48 may be formed immediately above the lower end 46 of the first cylinder 28, if desired.

Since the third cylinder 32 is provided in the preferred embodiment primarily as a flow channel for establishing fluid communication between the pressurized side 38 of the seal 26 and the outlet port 20, so that the seal assembly 10 may be substantially recessed below the well head 12, it is convenient to describe the third cylinder 32 together with the second cylinder 30. The second cylinder 30 has an upper end 58, a lower end 60 and a seal engaging portion 62 (see FIG. 3), while the third cylinder 32 has an upper end 64 and a lower end 66. The third cylinder 32 is sealingly connected to the portion 14 of the well head 12 around the opening 18 and the rod 16 in an appropriate manner, such as the weld indicated by the reference number 68. The lower end 66 of the third cylinder 32 has a threaded bore 70 therein for engaging the upper end 72 of the tubing string 22 using a conventional external upset thread pattern. The lower end 60 of the second cylinder 30 is held in engagement with the lower end 66 of the third cylinder 32 by the action of an end cap 74 which is threaded on the upper end 64 of the third cylinder 32 until the upper end 58 of the second cylinder 30 is engaged. The third cylinder 32 has a smaller inner diameter portion 76, adjacent the lower end 60 of the second cylinder 30, which slidably engages the second cylinder 30 and maintains the second cylinder 30 substantially centered in the third cylinder 32. The connection between the second cylinder 30 and the well head 12 via the end cap 74 and the third cylinder 32 is made fluid tight by an O-ring type seal 78 suitably disposed between the upper end 58 of the second cylinder 30 and the upper end 64 of the third cylinder 32.

In the preferred embodiment, the seal engaging portion 62 of the second cylinder 30 has a plurality of annular grooves 80 therein around the inner circumference thereof. A compression ring 82 sealingly connects the second end 36 of the seal 26 to the seal engaging portion 62 of the second cylinders 30, by compressing the second end 36 of the seal 26 into sealing engagement with the grooves 80. Since the second end 36 of the seal 26 is sealingly connected to the well head 12, it is clear that the seal 26 will rollingly extend between the first end 34 and the second end 36 thereof, as the first end 34 reciprocates with the rod 16.

As shown in FIG. 1, the second cylinder 30 is sufficiently long so as to circumferentially support the seal 26 on the inner surface 84 of the second cylinder 30 during the reciprocation of the rod 16. In addition, the first cylinder 28 is also sufficiently long so as to support the seal 26 on the outer surface 86 of the first cylinder 28 during the reciprocation of the rod 16. The outer diameter of the first cylinder 28 and the inner diameter of the second cylinder 30 are suitably adjusted to provide an adequate turning radius for the rolling portion 88 of the seal 26.

The third cylinder 32 has an inner diameter which is greater than the outer diameter of the second cylinder 30 centered therein, thereby forming an annulus 90 between the second cylinder 30 and the third cylinder 32. The annulus 90 effectively forms a flow path (indicated by the arrows at reference number 92) between the pressurized side 38 of the seal 26 and the outlet port 20. The flow path 92 has an inlet portion 94 in fluid communication with the pressurized side 38 of the seal 26 via a plurality of ports 96 in the second cylinder 30 below the seal engaging portion 62, an outlet portion 98 in fluid communication with the outlet port 20 via a port 100 in the third cylinder 32 near the upper end 64 thereof, and a connecting portion 102 between the inlet portion 94 and the outlet portion 98. Thus, fluid entering the rolling seal assembly 10 via the tubing string 22 will be forced by the action of the seal 26 to flow through the ports 96, up the flow path 92 and through the outlet port 20.

OPERATION OF THE PREFERRED EMBODIMENT

In an operational situation, the third cylinder 32, having the outlet port 20 integral therewith, will be connected to the upper end 72 of the tubing string 22 via the threaded bore 70 in the lower end 66 of the third cylinder 32. The third cylinder 32 will then be lowered downward through the opening 18 in the well head 12 into the well casing (not shown) to a desired position. The third cylinder 32 will then be sealingly connected to the well head 12, preferably by means of a removable portion 14 of the well head 12, such as a conventional doughnut previously welded at a safe location to the third cylinder 32.

In a separate operation, the first end 34 of the seal 26 should be sealingly connected to the seal engaging portion 48 of the first cylinder 28 by having the compression ring 56 either driven over, or swagged around, the first end 34 to compress the first end 34 into sealing engagement with the grooves 54 in the seal engaging portion 48. The second end 36 of the seal 26 should be sealingly connected to the seal engaging portion 62 of the second cylinder 30 in a similar manner. The pump rod 16 (which would normally be the polished rod) should then be inserted through the first cylinder 28 and sealingly connected thereto via the O-ring 50. The clamp 52 may be used to retain the first cylinder 28 in place on the rod 16, so that the rod 16 may be run.

With the third cylinder 32 and pump rod 16 in place, the first and second cylinders 28 and 30, respectively, with the seal 26 sealingly connected therebetween, may be lowered down the pump rod 16 until the lower end 60 of the second cylinder 30 engages the lower end 66 of the third cylinder 32. The second cylinder 30 should then be sealingly connected to the third cylinder 32 via the O-ring 78. The end cap 74 may then be threaded onto the upper end 64 of the third cylinder 32 thereby retaining the second cylinder 30 in sealing engagement with the well head 12. It should be noted that the end cap 74 also operates to center the rod 16 during the reciprocation thereof, and prevents abrasives from entering the annulus between the first and second cylinders 28 and 30, respectively. If desired, a blowout protection assembly and a dust seal may be included as a part of the end cap 74.

Having sealingly connected the second end 36 of the seal 26 to the well head 12 in the above described manner, the first cylinder 28 should be slidably positioned on, and clamped to, the pump rod 16 via the clamp 52, so that the seal 26 is able to extend between the first cylinder 28 and the second cylinder 30 as the first cylinder 28 reciprocates with the rod 16. As will be clear to one skilled in the art, the length of the portion of the seal 26 which rolls between engagement with the outer surface 86 of the first cylinder 28 and the inner surface 84 of the second cylinder 30 is substantially equal to one-half of the stroke distance of the pump rod 16. Thus, assuming that the first cylinder 28 is positioned on the rod 16 so as to substantially align the seal engaging portions 48 and 62 of the first and second cylinders 28 and 30, respectively, when the pump rod 16 is at the bottom of the stroke (as shown in FIG. 1), then the seal 26 should be substantially equal in length to the pump stroke distance with some additional length provided for the rolling portion 88. If a shorter seal 26 is desired, clearly the seal engaging portion 62 of the second cylinder 30 may be moved upward on the second cylinder 30 up to one-half of the stroke distance (to a position indicated by the reference number 104), at which position the seal 26 would need to be only slightly larger than one-half the pump stroke distance.

After the first cylinder 28 has been properly positioned in sealing engagement with the pump rod 16, the pump unit may be attached to the pump rod 16 and the output lines connected in a conventional manner to the outlet port 20. Upon reciprocation of the pump rod 16 via the pump unit, fluids will be drawn upward through the tubing string 22 and the bore 70 through the lower end 66 of the third cylinder 32, into the second cylinder 30 on the pressurized side 38 of the seal 26. Further reciprocation of the rod 16 forces the fluid through the ports 96 in the second cylinder 30, up the flow path 92 formed between the second and third cylinders 30 and 32, respectively, and out the outlet port 20, the seal 26 preventing the fluid from escaping therepast.

EMBODIMENT OF FIG. 4.

Shown in FIG. 4 is a modified rolling seal assembly 106 for sealing between a well head 108 and a pump rod 110 reciprocating through an opening 112 in the well head 108. The well head 108 in FIG. 4 has integral therewith a conventional outlet port 114, and may include a blowout prevention assembly 116 if desired. The pump rod 110 is connected to a pump unit (not shown) via a bridle assembly 118.

The rolling seal assembly 106 is comprised primarily of a flexible seal 120, a first cylinder 122 and a second cylinder 124. The seal 120, which is substantially the same as the seal 26 described above, has a first end 126, a second end 128, a pressurized side 130 and a nonpressurized side 132. As explained above, the seal 120 may be longitudinally reinforced as indicated by the reference numeral 134.

The first cylinder 122 has an upper end 136, a lower end 138 and a seal engaging portion 140. The first cylinder 122, which is substantially the same as the first cylinder 28 described above, is sealingly connected to the rod 110 by an O-ring 142 and a collet-type clamp 144 on the upper end 136 of the first cylinder 122.

The seal engaging portion 140 of the first cylinder 122 has a plurality of annular grooves 146 therein. A compression ring 148 sealingly connects the first end 126 of the seal 120 to the seal engaging portion 140 of the first cylinder 122, by compressing the first end 126 of the seal 120 into sealing engagement with the grooves 146. Thus, the first end 126 of the seal 120 will reciprocate with the first cylinder 122 and the rod 110.

The second cylinder 124 has an upper end 150, a flanged lower end 152 and a seal engaging portion 154. The second cylinder 124 is sealingly connected to the well head 108 around the opening 112 via a conventional union 156 comprised of a threaded base unit 158 and a removable nut 160.

The seal engaging portion 154 of the second cylinder 124 has a plurality of annular grooves 162 therein. A compression ring 164 sealingly connects the second end 128 of the seal 120 to the seal engaging portion 154 of the second cylinder 124, by compressing the second end 128 of the seal 120 into sealing engagement with the grooves 162. Since the second end 128 of the seal 120 is thus sealingly connected to the well head 108, the seal 120 will rollingly extend between the first end 126 and the second end 128 thereof, as the first end 126 reciprocates with the rod 110.

As shown in FIG. 4, the second cylinder 124 is sufficiently long so as to circumferentially support the seal 120 on the inner surface 166 of the second cylinder 124 during the reciprocation of the rod 110. In addition, the first cylinder 122 is also sufficiently long so as to support the seal 120 on the outer surface 168 of the first cylinder 122 during the reciprocation of the rod 110. The outer diameter of the first cylinder 122 and the inner diameter of the second cylinder 124 are suitably adjusted to provide an adequate turning radius for the rolling portion 170 of the seal 120.

As will be clear to one skilled in the art, the rolling seal assembly 106 will, in general, require that the pump unit be mounted sufficiently high so that the bridle assembly 118 will not engage the upper end 150 of the second cylinder 124 during the reciprocation of the rod 110. It is possible to partially obviate this difficulty, provided that the seal 120 is sufficiently strong, by shortening the second cylinder 124 so that the upper end 150 thereof is substantially immediately above the seal engaging portion 154 (in the area indicated by the reference numeral 172 in FIG. 4). As a result, the seal 120 will tend to "balloon" outward, away from the rod 110 thus decreasing the distance the seal 120 extends vertically upward at any moment during the reciprocation of the rod 110. However, due to the greatly increased surface area of the pressurized side 130 of the seal 120 responsible for the unaided containment of the pressurized fluid, this shortened configuration should be used only when it can be assured that the seal 120 is capable of continuously withstanding the expected operating pressures without premature failure.

If desired, a conventional dust seal may be mounted to the upper end 150 of the second cylinder 124 to prevent abasives from entering the second cylinder 124 from above.

OPERATION OF THE EMBODIMENT OF FIG. 4

The rolling seal assembly 106 shown in FIG. 4, operates substantially the same as the rolling seal assembly 10 shown in FIG. 1 except that the rolling seal assembly 106 is mounted substantially entirely above the well head 108 thus eliminating the need for the flow channel provided by the third cylinder 32. Thus, in an operational situation, the base unit 158 of the union 156 will initially be connected to the conventionally assembled well head 108. The seal 120 should be sealingly connected between the first and second cylinders 122 and 124, respectively, and the first cylinder 122 sealingly connected to the pump rod 110. The rod 110 may then be run.

The first and second cylinders 122 and 124, respectively, may then be lowered down the rod 110 until the lower end 152 of the second cylinder 124 engages the base unit 158. The nut 160 may then be threadably connected to the base unit 158 to draw the second cylinder 124 into sealing engagement with the well head 108. The first cylinder 122 is then slidably positioned on, and clamped to, the rod 110 so that the seal 120 is able to extend between the first cylinder 122 and the second cylinder 124 as the first cylinder 122 reciprocates with the rod 110. As explained above in the description of the operation of the preferred embodiment, the length of the seal 120 is dependent upon the position of the seal engaging portion 154 of the second cylinder 124 although the seal 120 must be capable of extending at least one-half the length of the pump stroke for the reasons explained above.

Having assembled the rolling seal assembly 106, the pump rod 110 may be connected to the pump unit. Reciprocation of the rod 110 will draw fluids upward into the well head 108 and into contact with the pressurized side 130 of the seal 120. Further reciprocation of the rod 110 forces the fluid through the outlet port 114 since the seal 110 prevents the fluid from escaping therepast.

EMBODIMENT OF FIG. 5

Shown in FIG. 5 is another modified rolling seal assembly 174 for sealing between a well head 176 and a pump rod 178 reciprocating through an opening 180 in the well head 176. The well head 176 is substantially the same as the well head 108 described above and includes an outlet port 182 and a blow-out prevention assembly 184. The pump rod 178 is connected to a pump unit (not shown) via a conventional bridle assembly 186.

The rolling seal assembly 174 is comprised primarily of a flexible seal 188, a first cylinder 190 and a second cylinder 192. The seal 188, which is substantially the same as the seals 26 and 120 described above, has a first end 194, a second end 196, a pressurized side 198 and a non-pressurized side 200. As explained above, the seal 188 may be longitudinally reinforced as indicated by the reference numeral 202.

The first cylinder 190 has an upper end 204, a lower end 206 and a seal engaging portion 208. The first cylinder 190 is sealingly connnected to an end cap 210 threaded on the upper end 204 thereof. The cap 210 is sealingly clamped to the rod 178 by a clamp 212 having elastomeric inserts 214 so that the first cylinder 190 is sealingly clamped to, and reciprocates with, the rod 178.

The seal engaging portion 208 of the first cylinder 190 has a plurality of annular grooves 216 therein around the inner circumference thereof. A compression ring 218 sealingly connects the first end 194 of the seal 188 to the seal engaging portion 208 of the first cylinder 190, by compressing the first end 194 of the seal 188 into sealing engagement with the grooves 216. It is clear, therefore, that the first end 194 of the seal 188 will reciprocate with the first cylinder 190 and the rod 178.

The second cylinder 192 has an upper end 220, a threaded lower end 222 and a seal engaging portion 224.

The second cylinder 192 is sealingly connected to the well head 176 by being threaded into the opening 180 in the well head 176.

The seal engaging portion 224 of the second cylinder 192 has a plurality of annular grooves 226 therein around the outer circumference thereof. A compression ring 228 sealingly connects the second end 196 of the seal 188 to the seal engaging portion 224 of the second cylinder 192, by compressing the second end 196 into sealing engagement with the grooves 226. Since the second end 196 of the seal 188 is sealingly connected to the well head 176, it is clear that the seal 188 will rollingly extend between the first end 194 and the second end 196 thereof, as the first end 194 reciprocates with the rod 178.

As shown in FIG. 5, the first cylinder 190 is sufficiently long so as to circumferentially support the seal 188 on the inner surface 230 of the first cylinder 190 during the reciprocation of the rod 178. In addition, the second cylinder 192 is also sufficiently long so as to support the seal 188 on the outer surface 232 of the second cylinder 192. The inner diameter of the first cylinder 190 and the outer diameter of the second cylinder 192 are suitably adjusted to provide an adequate turning radius for the rolling portion 234 of the seal 188.

The second cylinder 192 has an inner diameter which is greater than the outer diameter of the rod 178, thereby providing an annulus 236 between the second cylinder 192 and the rod 178. The annulus 236 effectively provides fluid communication between the pressurized side 198 of the seal 188 and the outlet port 182. Thus fluid entering the rolling seal assembly 174 from the well head 176 flows up the annulus 236 and into contact with the pressurized side 198 of the seal 188. There will, however, be only a slight back and forth flow through the annulus 236 once the rolling seal assembly 174 has been effectively "filled" with the pressurized fluid since the seal 188 is sealingly connected between the well head 176 and the rod 178.

Substantially as explained above in the description of the embodiment of FIG. 4, the first cylinder 190 may be shortened so that the lower end 206 thereof is substantially immediately below the seal engaging portion 208 (in the area indicated by the reference numeral 238 in FIG. 5). However, by thus allowing the seal 188 to "balloon" outward, the area of the pressurized side 198 subjected to stress by the pressurized fluid is greatly increased. The configuration should therefore be used only when the seal 188 can be reasonably expected to continuously withstand the expected operating pressures.

If desired, a conventional dust seal may be mounted to the lower end 206 of the first cylinder 190 to prevent abrasives from entering the first cylinder 190 from below.

OPERATION OF THE EMBODIMENT OF FIG. 5

The rolling seal assembly 174 shown in FIG. 5, operates substantially the same as the rolling seal assembly 106 shown in FIG. 4 except that the first cylinder 190 has an inner diameter greater than the outer diameter of the second cylinder 192 thereby causing the first cylinder 190 to reciprocate around the second cylinder 192 instead of inside the second cylinder 192. In an operational situation, the seal 188 should first be sealingly connected between the first and second cylinders 190 and 192, respectively, and the first cylinder 190 sealingly connected to the pump rod 178. The rod 178 may then be run through the assembled well head 176.

The first and second cylinders 190 and 192, respectively, may then be lowered down the rod 178 and the lower end 222 of the second cylinder 192 threaded into sealing engagement with the well head 176. The first cylinder 190 is then slidably positioned on, and clamped to, the rod 178 so that the seal 188 is able to extend between the first cylinder 190 and the second cylinder 192 as the first cylinder 190 reciprocates with the rod 178. Substantially as explained above, the length of the seal 188 will be generally dependent upon the position of the seal engaging portion 208 of the first cylinder 190, with the minimum extension of the seal 188 being at least one-half the stroke distance.

Having assembled the rolling seal assembly 174, the pump rod 178 may be connected to the pump unit. Reciprocation of the rod 178 will draw fluids upward into the well head 176, through the annulus 236 between the second cylinder 192 and the rod 178, and into contact with the pressurized side 198 of the seal 188. Further reciprocation of the rod 178 forces the fluid through the outlet port 182 since the seal 188 prevents the fluid from escaping therepast.

Although numerous changes and modifications may readily occur to those skilled in the art, such changes may be made in the construction and the arrangement of the parts or the elements of the various embodiments as disclosed herein without departing from the spirit and scope of the invention as defined in the following claims.

What is claimed is:

1. A rolling seal assembly for sealing between a well head having an outlet port, and a pump rod reciprocating a predetermined stroke distance through an opening in the well head, comprising:
   a substantially tubular, flexible seal encircling the rod adjacent to the well head, the seal having a first end, a second end, a pressurized side and a non-pressurized side, and being sized to extend at least one-half the stroke distance;
   a first cylinder connected around the rod adjacent to the well head and reciprocating with the rod, the first cylinder having a seal engaging portion defined around an outer circumferential portion thereof;
   a seal interposed between the first cylinder and the rod sealingly connecting the first cylinder and the rod;
   compression means for compressing the first end of the seal into sealing engagement with the seal engaging portion of the first cylinder; and,
   means for sealingly connecting the second end of the seal to the well head around the opening and the rod reciprocating therethrough, the seal rollingly extending between the first and second ends thereof as the first end reciprocates with the rod.

2. The seal assembly of claim 1 wherein the first cylinder is further characterized as being sized to circumferentially support the seal during the reciprocation of the rod.

3. The seal assembly of claim 1 wherein the seal engaging portion of the first cylinder is further characterized as having a plurality of annular grooves therein, and the connecting means is further characterized as a compression ring compressing the first end of the seal into sealing engagement with the grooves in the seal engaging portion of the first cylinder.

4. The seal assembly of claim 1 wherein the means for sealingly connecting the second end of the seal to the well head is further defined as comprising:
   a second cylinder having a seal engaging portion, the second cylinder being sealingly connected to the well head around the opening and the rod reciprocating therethrough; and,
   connecting means for sealingly connecting the second end of the seal to the seal engaging portion of the second cylinder.

5. The seal assembly of claim 4 wherein the second cylinder is further characterized as being sized to circumferentially support the seal during the reciprocation of the rod.

6. The seal assembly of claim 4 wherein the seal engaging portion of the second cylinder is further characterized as having a plurality of annular grooves therein, and the connecting means is further characterized as a compression ring compressing the second end of the seal into sealing engagement with the grooves in the seal engaging portion of the second cylinder.

7. The seal assembly of claim 4 wherein the means for sealingly connecting the second end of the seal to the well head is further defined to include: flow channel means for establishing fluid communication between the pressurized side of the seal and the outlet port.

8. The seal assembly of claim 7 wherein the flow channel means is further characterized as a third cylinder sealingly connected to the well head around the opening and the rod reciprocating therethrough, the third cylinder forming a flow path between the second cylinder and the third cylinder, the flow path having an inlet portion in fluid communication with the pressurized side of the seal, an outlet portion in fluid communication with the outlet port, and a connecting portion between the inlet and outlet portions thereof.

9. The seal assembly of claim 1 wherein the seal is longitudinally reinforced.

10. A rolling seal assembly for sealing between a well head having an outlet port, and a pump rod reciprocating a predetermined stroke distance through an opening in the well head, comprising:
    a substantially tubular, flexible seal encircling the rod adjacent to the well head, the seal having a first end, a second end, a pressurized side and a non-pressurized side, and being sized to extend at least one-half the stroke distance;
    a first cylinder connected around the rod adjacent to the well head and reciprocating with the rod, the first cylinder having a seal engaging portion defined around an outer circumferential portion thereof;
    a seal interposed between the first cylinder and the rod sealingly connecting the first cylinder and the rod;
    compression means for compressing the first end of the seal into sealing engagement with the seal engaging portion of the first cylinder;
    a second cylinder having a seal engaging portion, the second cylinder being sealingly connected to the well head around the opening and the rod reciprocating therethrough, the second cylinder being sized to circumferentially support the seal during the reciprocation of the rod;
    connecting means for sealingly connecting the second end of the seal to the seal engaging portion of the second cylinder; and a third cylinder sealingly connected to the well head around the opening and the rod reciprocating therethrough, the third cylinder forming a flow path between the second cylinder and the third cylinder, the flow path having an inlet portion in fluid communication with the pressurized side of the seal, an outlet portion in fluid communication with the outlet port and a connecting portion between the inlet and outlet portions thereof.

* * * * *